Sept. 28, 1954 R. W. ISEMAN 2,690,083
BICYCLE GEAR
Filed Feb. 18, 1949 2 Sheets-Sheet 1
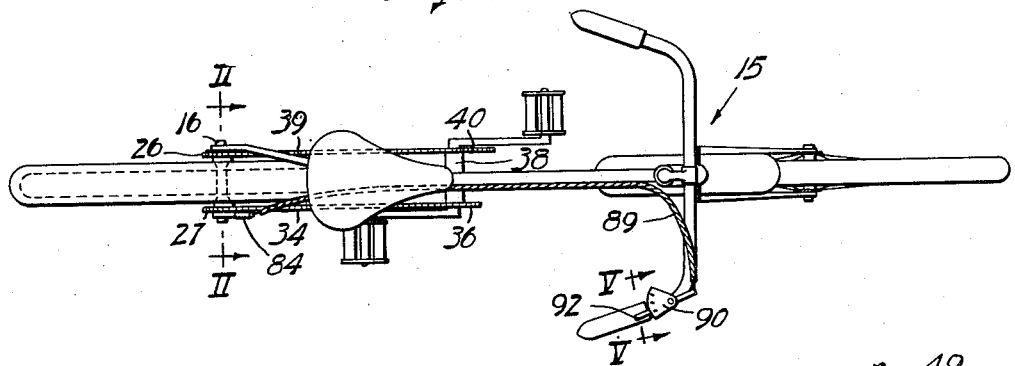
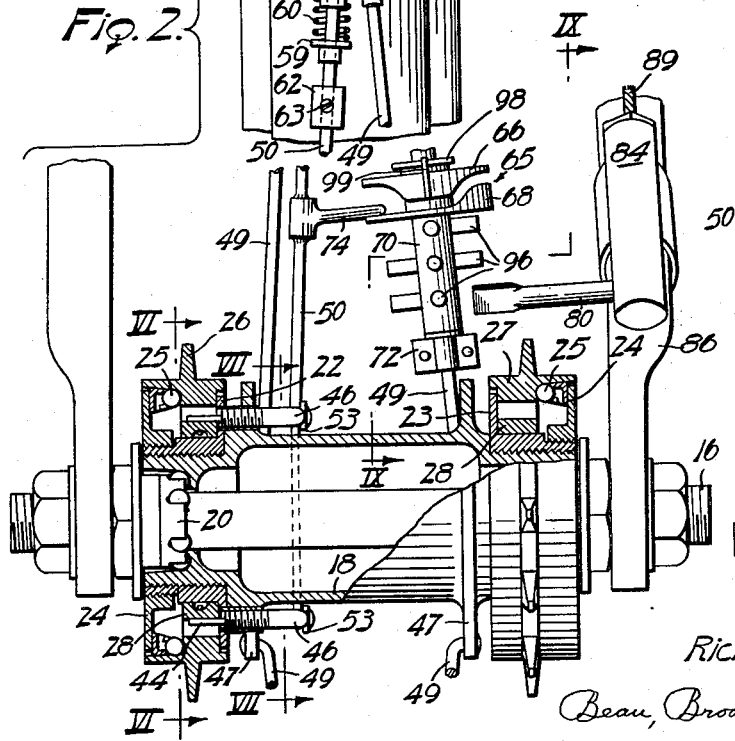
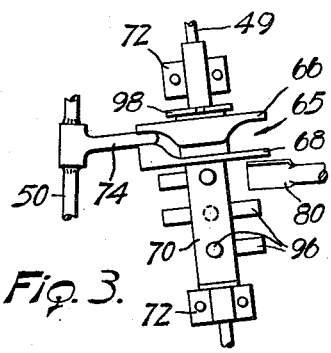
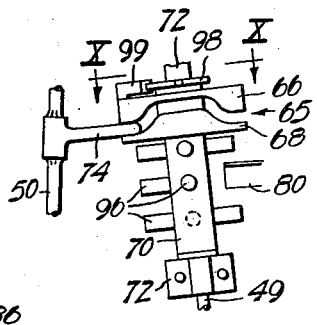
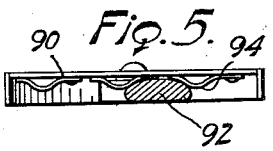
INVENTOR
Richard W. Iseman
BY
Bean, Brooks, Buckley & Bean
ATTORNEYS Sept. 28, 1954    R. W. ISEMAN    2,690,083
BICYCLE GEAR
Filed Feb. 18, 1949    2 Sheets-Sheet 2
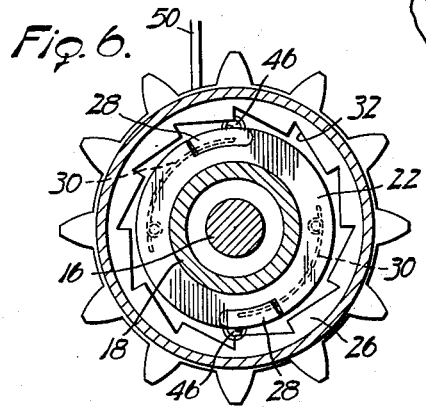
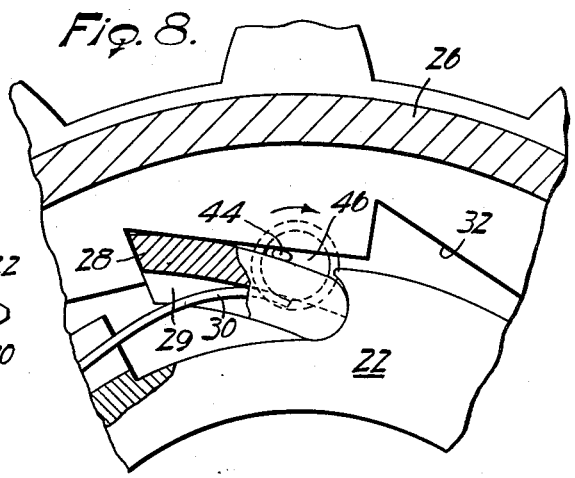
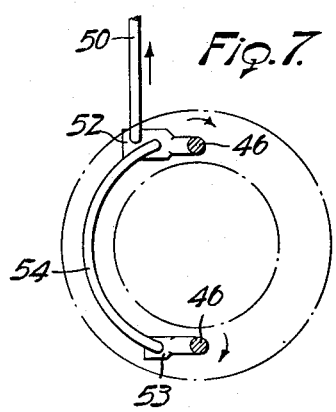
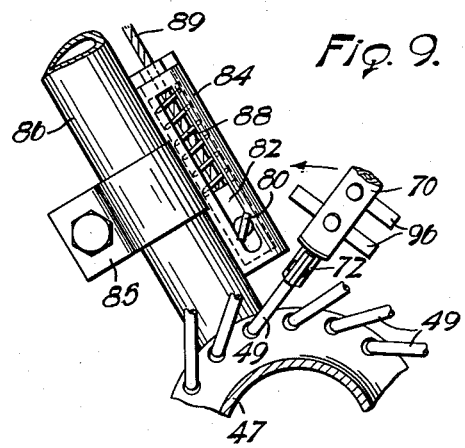
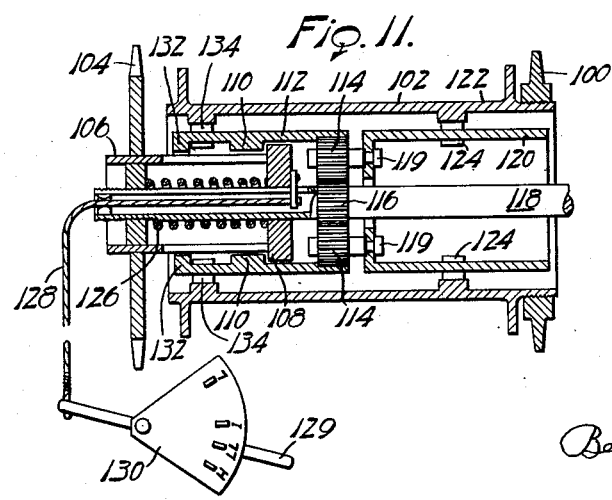
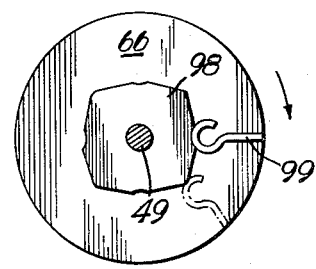
INVENTOR
*Richard W. Iseman*
BY
*Bean, Brooke, Buckley & Bean*
ATTORNEYS Patented Sept. 28, 1954

2,690,083

UNITED STATES PATENT OFFICE 2,690,083

BICYCLE GEAR

Richard W. Iseman, Kenmore, N. Y., assignor to
Einar Swensson, East Aurora, N. Y.

Application February 18, 1949, Serial No. 77,187

10 Claims. (Cl. 74—217)

This invention relates to improvements in multi-gear drive mechanisms in bicycles and the like, and has for one of its objects to provide an improved multi-gear mechanism which is adapted to be readily constructed by simple modifications of presently standard bicycle "coaster-brake"; free-wheel; and multi-speed gear devices.

Another object of the invention is to provide an improved multi-gear drive mechanism in bicycles and the like, which is of simplified construction.

Another object of the invention is to provide an improved multi-gear drive device for bicycles and the like, which is automatically responsive to varying driving conditions to cause proper selective employment of the various gear arrangements.

Another object of the present invention is to provide an improved multi-gear drive device for bicycles and the like, said device being automatically responsive to different wheel speeds for causing proper selective use of the available gear arrangements.

Other objects and advantages of the invention will appear from the specification hereinafter.

In the drawing:

Fig. 1 is a top plan of a bicycle embodying the invention;

Fig. 2 is a fragmentary section, on an enlarged scale, taken along line II—II of Fig. 1;

Fig. 3 is a view corresponding to a portion of Fig. 2, but showing the mechanism thereof in a different position of adjustment;

Fig. 4 is a view similar to Fig. 3, but showing the mechanism thereof in still different position of adjustment;

Fig. 5 is a section, on a larger scale, taken along line V—V of Fig. 1;

Fig. 6 is a section taken along line VI—VI of Fig. 2;

Fig. 7 is a section taken along line VII—VII of Fig. 2;

Fig. 8 is a fragmentary illustration on a larger scale of a portion of the mechanism shown in Fig. 6;

Fig. 9 is a section taken along line IX—IX of Fig. 2;

Fig. 10 is a section taken along line X—X of Fig. 4; and

Fig. 11 is a sectional view through another form of standard gear unit to which has been applied the present invention.

The invention is illustrated in Figs. 1–10 of the drawing as being applied to a bicycle which is indicated generally at 15 having a rear axle 16. The axle 16 mounts a wheel hub 18 by means of bearings 20. At its opposite ends the hub 18 carries a pair of mounting flanges 22—23 in rigidly threaded relation thereon, and the mounting flanges are externally threaded to receive bearing plates 24—24 which when in position lock ball-bearing members 25—25 and sprocket races 26—27 in position upon the opposite ends of the axle housing so that the sprockets 26—27 are thereby mounted to rotate relative to the axle hub 18. However, the flanges 22—23 each carry one or more ratchet dogs 28—28 (Figs. 6 and 8); said dogs being grooved as indicated at 29 (Fig. 8) to receive the free end portions of cantilever springs 30 which are arranged to bias the dogs 28 outwardly into engagement with ratchet tooth portions 32 formed internally of the sprockets 26—27.

The sprocket 27 at the right hand end portion of the wheel axle as viewed in Fig. 2, is operably connected by means of an endless chain 34 to a relatively small diameter drive sprocket 36 which is keyed to the bicycle pedal crank 38 in the usual manner; while the sprocket 26 is similarly connected by means of an endless chain 39 to a relatively large diameter sprocket 40 which is also keyed to the pedal crank. Thus, it will be appreciated that the wheel hub 18 is operably connected to the pedal crank 38 by means of two independent chain and sprocket systems which are arranged to provide different gear ratios between the pedal crank and the wheel hub. Also, it will be appreciated that these two chain driving systems are both connected to the wheel hub through means of an overrunning clutch mechanism, so that as long as the ratchet dog devices of both clutch mechanisms are unmolested the relatively high speed driving chain mechanism will operate automatically to drive through the chain 39 so as to rotate the wheel hub at high speed and to thereby overrun the relatively slower speed rotational motion of the sprocket 27 which is at the same time being driven at a lower speed through means of the chain 34.

Thus under such conditions of operation the bicycle will operate in the manner of any conventional single speed bicycle having only a counterpart of the sprocket 40 and the chain 39. However, it will be appreciated that if the ratchet dog devices of the sprocket 26 are pulled out of engagement with the sprocket 26, then the ratchet devices of the sprocket 27 will go into action to provide driving connection to the rear wheel through the sprocket 36 and the chain 34; thus providing a relatively "low gear" connection between the pedal crank and the rear wheel to render negotiation of upgrades less difficult, and to permit relatively rapid accelerations and "quick starting" from standstill, such as is desirable in bicycle racing and the like.

To provide for such shifting of the gear mechanism as referred to hereinabove, the dogs 28—28 of the sprocket device 26 are arranged to be depressed out of sprocket engaging position by means of arms 44 (Fig. 8 and Fig. 2) which extend in axial direction from corresponding control rods 46—46 which are rotatably mounted to extend through suitably apertured portions of the wheel hub spoke flange 47; the wheel spokes being indicated at 49. The depresser arms 44 are formed eccentrically of the rods 46, whereby rotation of the rods 46 will cause the arms 44 to be displaced alternately toward and away from the center of the wheel axle system; and thus whereas Fig. 6 shows the dogs 28—28 to be depressed by the arms 44 of the rods 46, it will be understood that in other positions of the rods 46 the arms 44 will permit the dogs to pivot outwardly so as to engage the ratchet structure, as illustrated in Fig. 8.

Whereas, it is contemplated that any suitable means may be employed for controlling the depresser control arms 44—46, such as a manual control device extending to some suitable lever or similar manually operable device disposed within convenient reach of the bicycle rider, it is also contemplated by the present invention that the dog control rods be operated automatically in accord with the speed of the bicycle travel. That is, it is contemplated that so long as the bicycle is traveling at relatively slow speed, such as during acceleration at the start or in traversing unusually rough ground or upgrades or the like, the control mechanism will automatically operate so as to maintain the dogs 28 of the sprocket system 26 in disconnected condition so that the bicycle drive will be through the low speed chain 34, thereby giving the rider the correspondingly increased leverage and power. Then, whenever the bicycle attains the normal or otherwise predetermined riding speed the control mechanism will operate automatically to release the dogs 28—28 of the sprocket device 26 so as to engage the latter, thereby throwing the bicycle driving mechanism over into "high gear" so that in return for a slower rate of pedaling the rider may obtain a higher rate of bicycle travel, compared to the operation obtainable through use only of the low speed chain 34.

An apparatus providing such type automatic control is illustrated in Figs. 2 and 7 to comprise a pitman rod 50 which pivotally connects at its lower end to an arm 52 extending laterally from one of the rods 46. The other rod 46 is similarly fitted with an arm 53 into which is pivotally connected one end of a tie rod 54, the other end of which pivotally connects into the arm 52 (Fig. 7). Thus, the rods 46—46 are interconnected for coordinated operation, and up and down movement of the rod 50 (Figs. 2 and 7) will cause simultaneous rotations of the rods 46—46 for corresponding control of the ratchet dogs 28. The upper end of the control rod 50 is slidably mounted within a ferrule 56 which is conveniently mounted upon the wheel rim 58; and the rod 50 is provided with a shoulder 59 which engages against a compression spring 60, the other end of which is mounted to encircle the ferrule 56.

Thus, the spring 60 urges the control rod 50 to move downwardly as illustrated in Figs. 2–7, thereby urging the rods 46—46 to rotate so as to force the ratchet dogs 28 to be depressed so that only the low speed chain 34 is in operable connection between the pedal crank and the rear wheel. However, upon attainment of normal riding speed, the bicycle wheel will then be rotating at such rate that the centrifugal force acting upon the control rod 50 will tend to displace it radially and outwardly away from the wheel hub center, thereby overcoming the action of the spring 60 and causing the control rod 50 to move so as to release the dogs 28—28 for engagement with the sprocket 26, whereupon a normal "high gear" bicycle operation will go into effect. To facilitate this centrifugal control of the rod 50, a suitable mass such as is indicated at 62 (Fig. 2) may be conveniently attached to the rod 50 as by means of a set screw 63; the weight of the member 62 being so selected as to give the desired automatic gear shift control, according to the preferences of the rider.

The invention also contemplates provision of a manually operable over-control device whereby the bicycle rider will at all times have full manual control of the gear shifting mechanism in spite of the presence of the automatically operable centrifugal control device referred to hereinabove. For example, as illustrated in Figs. 2–9, such manual overcontrol mechanism may comprise a cam device 65 which is rotatably mounted upon one of the bicycle spokes 49. The cam device 65 includes a variable elevation cam track with a variable width cam opening, and is conveniently constructed by arranging a pair of opposed plates 66—68 in keyed relation upon a cylindrical stem 70 so that the parts 66—68—70 are structurally integral and rotate together upon the mounting spoke 49. A clamp 72 is conveniently arranged to grip firmly upon the spoke 49 below the desired position of the cam device, so as to maintain the latter at the desired position on the spoke without interfering with free rotation thereof. The ratchet dog control rod 50 is provided with a laterally extending finger 74 which reaches over into the gap between the two cam plates 66—68, and the control finger 74 and the cam plates are so constructed and relatively arranged that when the cam device 65 is in its neutral position of adjustment as illustrated in Fig. 2 of the drawing, the finger 74 is thereupon disposed between the relatively wide gap portion of the cam device so that the control rod 50 is free to move radially of the rear wheel axle between positions of automatic gear shifting operation as explained hereinabove.

Thus, when the cam device 65 is in the position of adjustment shown in Fig. 2, it does not interfere in any manner with the automatic operation of the centrifugal gear shift control mechanism described hereinabove. However, the cam device 65 is so constructed and arranged that upon rotation thereof away from the position shown in Fig. 2 and into the position thereof shown in Fig. 3, the control finger 74 will become engaged within a narrow track portion of the cam device and elevated by the latter so as to forcibly lift the control rod 50 out of the position thereof shown in Fig. 2 and into the "high speed" gear position described hereinabove. As long as the cam device 65 is maintained in the position of adjustment shown in Fig. 3 the gear shift control mechanism is thereby locked in "high speed" condition.

On the other hand, upon rotation of the cam device 65 as to the position thereof shown in Fig. 4, the control arm 74 will thereby become forcibly depressed so as to force the control rod 50 inwardly toward the hub center, thereby locking the gear shift mechanism in "low speed" condition. Any suitable mechanism permitting manual control of the cam mechanism 65 may of course be used for control of the latter; however, a suitable control device is illustrated in the drawing (Figs. 2 and 9) to comprise a cam lever arm 80 which extends laterally from a cross head 82 which is slidably mounted within a cylinder 84 carried by means of a clamp 85 upon one of the fork portions 86 of the bicycle frame. The cross head member 82 is arranged to be normally depressed toward the hub center line by means of a compression spring 88 housed within the casing 84, and the cross head 82 is connected to one end of a flexible cable 89 which runs up into connection with the operating lever portion of a manual control device 90 such as may be conveniently attached to the bicycle handle bar (Fig. 1). The control device is arranged so that the lever device 92 is pivotally mounted relative to the control plate 90, whereupon pivoting of the lever 92 will cause the cable 89 to be pulled upon to various degrees against the action of the spring 88. Thus, the elevational position of the control arm 80 as viewed in Fig. 2 may be adjusted by suitable adjustment of the control lever 92. A leaf spring arrangement as indicated at 94 (Fig. 5) may be conveniently employed for maintaining the adjustment lever 92 in its various positions of adjustment in spite of the constant pull of the cable spring 88.

The cam sleeve 70 is fitted with outstanding paddle portions 96 extending radially therefrom at 90° positions therearound; there being a paddle omitted from the side of the cam facing the position of the control bar 80 at the elevation thereof corresponding to "neutral" position in the control system. Thus, with the parts in the relative positions thereof shown in Fig. 2, the bicycle wheel is free to rotate without interference by the control bar 80 with any of the paddles extending from the cam sleeve 70, but upon manual adjustment of the control bar 80 upwardly such as to the elevation of the second row of paddles extending from the cam sleeve, the bar 80 will thereupon contact the paddles at said second elevation and thereby cause the sleeve to rotate until such time as the position of the gap or missing paddle at that elevation turns into registry with the control arm 80, whereupon the cam sleeve 70 will come to rest at "low speed" position. Similarly, upon further adjustment of the manual control device 92 so as to elevate the control bar 80 into line with the top row of paddles extending from the cam sleeve 70 the cam device will be caused thereby to rotate until such time as it comes into position corresponding to "high speed" adjustment of the gear, whereupon the cam device will stop rotating and will thereupon hold the control rod 50 locked in "high speed" position. As illustrated in Fig. 10, a simple spring biased device may be employed to control such rotations of the cam device; the spoke 49 having keyed thereto a detent plate 98, the periphery of which is adapted to engage the free end of a spring finger 99 which extends in cantilever fashion from the top cam plate 66. Thus, as the cam plates revolve the finger 99 is carried along therewith and resiliently engages the periphery of the detent plate 98 so that the latter is adapted to snub the rotation of the cam device and to stop the latter except whenever the paddles 96 of the cam sleeve are being forcibly displaced by reason of contact with the control arm 80.

Fig. 11 illustrates application of the invention to another form of bicycle driving multi-gear arrangement of the type such as is known as the "Sturmy Archer" gear. In this case the standard "Sturmy Archer" type gear housing is equipped with a supplementary drive sprocket 100; the sprocket 100 being rigidly mounted upon the housing 102 forming part of the standard Sturmy Archer gear. The usual drive sprocket for the gear is indicated at 104 and is keyed to a housing 106 carrying an axially movable clutch member 108. The clutch member 108 is adapted to slide between positions of engagement and disengagement relative to clutch dogs 110 extending interiorly of a gear casing 112 for intermediate speed operation.

The casing 112 is internally toothed to engage a pair of planetary gears 114—114 which mesh with a central sun gear 116 which is carried upon the wheel axle 118. The planetary gears 114—114 are carried upon pins 119—119 which are mounted upon a housing 120 which is permanently geared to the wheel hub 122 by means of dogs 124—124. The clutch member 108 is also movable further upon its spline connection with the housing 106 so that it locks between the pins 119, thereby providing "high speed" gear relation. A compression spring 126 is arranged to bias the clutch 108 toward the right as viewed in Fig. 11 and to resist motion of the clutch member 108 to the left in response to pull thereupon by means of a cable 128 which in turn leads to a control lever 129 pivoted upon a calibrated bracket 130. Thus, it will be appreciated that movement of the control lever 129 to such position as to neutralize or disengage the clutch member 108, will thereby "neutralize" the standard Sturmy Archer gear and permit the sprockets 100 to go into action to give "super low" gear operation, as explained hereinabove. The housing 112 is also provided with dogs 132 at the left end thereof for engagement by the clutch 108 for standard low speed operation; the dogs 134 which normally gear the housing 112 to the hub 102 being cammed out of engagement by the clutch 108 whenever the latter is pulled into gear with the dogs 132.

Thus, it will be appreciated that the invention contemplates addition to any single or multi-gear bicycle driving mechanism, of an additional "super low" gear device and means for selective control of the mechanism so that the desired driving gear ratio is available under any condition of operation; and that preferably such gear changing operations will be performed automatically in response to operation of a centrifugal force controlled actuator as explained hereinabove.

I claim:

1. A bicycle driving gear comprising in combination, a pedal crank, a traction wheel including a wheel hub, a large pedal sprocket and a small pedal sprocket keyed to said pedal crank, a first drive sprocket and a second drive sprocket carried by said hub separately and in free wheeling relation thereon, an endless chain interconnecting said large pedal sprocket and said first drive sprocket, an endless chain interconnecting said small pedal sprocket and said second drive sprocket, first ratchet pawl means carried by said hub and spring-biased for normal driving connection between said hub and said first drive sprocket, second ratchet pawl means carried by said hub and spring-biased toward engagement with said second drive sprocket, ratchet control means carried by said hub operable to disengage said hub relative to said first drive sprocket, and centrifugal force responsive means comprising a mass slidably supported upon said wheel to be responsive to centrifugal forces of rotation thereof and thereby operable automatically upon attainment of a predetermined wheel speed to move radially of said wheel to overcome said ratchet pawl control means so as to release said first ratchet pawl mechanism to provide driving connection between said large pedal sprocket and said wheel hub for high gear operation.

2. A bicycle driving gear comprising in combination, a pedal crank, a traction wheel including a wheel hub, separate hub drive means carried by said hub in free wheeling relation thereon, separate drive chain means interconnecting said pedal crank and respective of said separate hub drive means, plural ratchet pawl means carried by said hub and spring-biased for driving connection between said hub and said hub drive means at different gear ratios, ratchet control means carried by said hub and connected to be operable to selectively engage said hub relative to said hub drive means, and centrifugal force responsive means mounted upon said wheel and operable automatically upon attainment of a predetermined wheel speed to overcome said ratchet pawl control means so as to provide adjustment of said hub engaging means to higher gear ratio condition.

3. A bicycle driving gear comprising in combination, a pedal crank, a traction wheel including a wheel hub, a large pedal sprocket and a small pedal sprocket keyed to said pedal crank, a first drive sprocket and a second drive sprocket carried by said hub separately and in free wheeling relation thereon, an endless chain interconnecting said large pedal sprocket and said first drive sprocket, an endless chain interconnecting said small pedal sprocket and said second drive sprocket, first ratchet pawl means carried by said hub and spring-biased for normal driving connection between said hub and said first drive sprocket, second ratchet pawl means carried by said hub and spring-biased toward engagement with said second drive sprocket, ratchet control means carried by said hub and operable to disengage said hub relative to said first drive sprocket, centrifugal force responsive means carried by said wheel and operable automatically upon attainment of a predetermined wheel speed to overcome said ratchet pawl control means so as to release said first ratchet pawl mechanism to provide driving connection between said large pedal sprocket and said wheel hub for high speed operation, and manual control means arranged to over-control said centrifugal release means.

4. A bicycle driving gear comprising in combination, a pedal crank, pedal sprockets of different size keyed to said pedal crank, a traction wheel, a change gear mechanism providing selectively low or high speed operation and including relatively shiftable gears carried by said wheel, chain means interconnecting said pedal sprockets and said change gear mechanism, and centrifugal force responsive means comprising a centrifugal force responsive mass movably carried by said wheel and connected to said gear mechanism and operable automatically upon attainment of a predetermined wheel speed to shift said gear mechanism to provide adjusting driving connection between said pedal sprockets and said wheel for high speed operation.

5. A bicycle driving gear arrangement comprising in combination, a pedal crank, a traction wheel, a change gear mechanism providing selectively low or high speed operation and including relatively shiftable gears carried by said wheel, chain means interconnecting said crank and said change gear mechanism, centrifugal force responsive means comprising a centrifugal force responsive mass movably carried by said wheel and connected to said gear mechanism and operable automatically upon attainment of a predetermined wheel speed to adjust said gear mechanism to a higher speed operation, and manual control means connected and arranged for over-control of said automatic gear change means, said manual control means including means for shifting the position of said mass without respect to wheel speed.

6. A bicycle driving gear comprising in combination, a pedal crank, pedal sprockets of different size keyed to said pedal crank, a traction wheel, a change gear mechanism providing selectively low or high speed operation and including relatively shiftable gears carried by said wheel, chain means interconnecting said pedal sprockets and said change gear mechanism, and centrifugal force responsive means comprising a mass movably carried by said wheel and connected to said gear mechanism and operable automatically upon attainment of predetermined variances of the wheel speed to shift the driving connection of said gear mechanism with said pedal sprockets between relatively low and high speed operating conditions.

7. A bicycle driving gear arrangement comprising in combination, a pedal crank, a traction wheel, a changeable gear mechanism providing selectively low or high speed operation and including relatively shiftable gears carried by said wheel, chain means interconnecting said crank and said gear mechanism, centrifugal force responsive means comprising a mass movably carried by said wheel and connected to said gear mechanism and operable automatically upon variances of the wheel speed to adjust said gear mechanism to different speeds of operation, and manual control means connected and arranged for over-control of said automatic gear change means, said manual control means comprising a position controlling member movably carried by said wheel and operatively related to said centrifugal force responsive means, and means for selectively engaging and moving said member to regulate the position of said centrifugal force responsive means without respect to wheel speed.

8. A bicycle driving gear arrangement comprising in combination, a pedal crank, a traction wheel, a changeable gear mechanism providing selectively low or high speed operation and including relatively shiftable gears carried by said wheel, chain means interconnecting said crank and said gear mechanism, centrifugal force responsive means comprising a mass movably carried by said wheel and connected to said gear mechanism and operable automatically upon variances of the wheel speed to adjust said gear mechanism to different speeds, and manual control means connected and arranged for over-control of said automatic gear change means and including a cam device movable to force said centrifugal means to shift without respect to wheel speed.

9. A bicycle including a frame and a driving gear arrangement comprising in combination, a pedal crank, a traction wheel, a changeable gear mechanism providing selectively low or high speed operation and including relatively shiftable gears carried by said wheel, chain means interconnecting said crank and said gear mechanism, centrifugal force responsive means comprising a mass movably carried by said wheel and connected to said gear mechanism and operable automatically upon variances of the wheel speed to adjust said gear mechanism to different speeds, and manual control means connected and arranged for over-control of said automatic gear change means comprising a finger mounted upon said frame and movable in response to manual adjustment of said control means, a spindle mounted upon said wheel and having paddles extending radially therefrom for interference with said finger, said spindle being rotatably carried upon a wheel spoke and having a variable surface cam integral therewith operatively related to said centrifugal means, said cam being thereby rotatable to force said centrifugal means to shift without respect to wheel speed.

10. A bicycle driving gear comprising in combination, a pedal crank, pedal sprockets of different size keyed to said crank, a traction wheel, a change gear mechanism providing selectively low or high speed operation and including relatively shiftable gears carried by said wheel, drive means interconnecting said pedal sprockets and said wheel, and centrifugal force responsive means mounted upon said wheel and connected to said gear mechanism, said centrifugal means being operable automatically upon variances of wheel speed to shift said gear mechanism to provide driving connection between said pedal sprockets and said wheel at various operating speeds.

References Cited in the file of this patent

UNITED STATES PATENTS

| Number | Name | Date |
|--------|------|------|
| 463,302 | Decker | Nov. 17, 1891 |

FOREIGN PATENTS

| Number | Country | Date |
|--------|---------|------|
| 319,431 | France | July 22, 1902 |
| 468,969 | Great Britain | July 16, 1937 |
| 481,737 | Great Britain | Mar. 14, 1938 |